United States Patent [19]

Gorner et al.

[11] Patent Number: 5,398,370
[45] Date of Patent: Mar. 21, 1995

[54] WIPER SYSTEM HAVING A DEPRESSION FOR ACCOMMODATING A FLUID HOSE

[75] Inventors: Eugen Gorner, Ingersheim; Helmut Karl, Schwaigern; Oldrich Krizek, Bietigheim-Bissingen, all of Germany

[73] Assignee: ITT Automotive Europe GmbH, Germany

[21] Appl. No.: 81,376

[22] PCT Filed: Oct. 21, 1992

[86] PCT No.: PCT/EP92/02413

§ 371 Date: Jun. 23, 1993

§ 102(e) Date: Jun. 23, 1993

[87] PCT Pub. No.: WO93/08047

PCT Pub. Date: Apr. 29, 1993

[30] Foreign Application Priority Data

Oct. 23, 1991 [DE] Germany ............... 41 34 980.6

[51] Int. Cl.[6] ............. B60S 1/32; B60S 1/48/1/46
[52] U.S. Cl. ............. 15/250.35; 15/250.04; 15/250.34
[58] Field of Search ......... 15/250.04, 250.03, 250.02, 15/250.01, 250.35, 250.34, 250.31; 239/284.1, 284.2, 600; 403/387, 384

[56] References Cited

U.S. PATENT DOCUMENTS

| | | | |
|---|---|---|---|
| 3,008,170 | 11/1961 | Marks | 239/284.1 |
| 3,427,675 | 2/1962 | Tibbet | 15/250.04 |
| 3,670,354 | 6/1972 | Weber | 15/250.35 |
| 3,887,956 | 6/1975 | Wind | 15/250.04 |
| 3,916,473 | 11/1975 | Williams | 15/250.35 |

FOREIGN PATENT DOCUMENTS

| | | | |
|---|---|---|---|
| 1295138 | 4/1962 | France | 15/250.04 |
| 2410733 | 9/1974 | Germany | 15/250.04 |
| 2509876 | 9/1975 | Germany | |
| 8706029 | 10/1988 | Germany | |
| 3907967 | 9/1990 | Germany | 15/250.04 |

Primary Examiner—David A. Scherbel
Assistant Examiner—Gary K. Graham
Attorney, Agent, or Firm—Robert P. Seitter; J. Gordon Lewis

[57] ABSTRACT

This invention refers to a wiper system for windshields of motor vehicles. This wiper system comprises a wiper arm which can be attached to an oscillatorily drivable wiper shaft by way of an attachment piece. The wiper arm comprises a joint piece being essentially U-shaped in cross-section, flexibly embracing the attachment piece with its planar walls, and a cover for the attachment piece essentially U-shaped in cross-section and embracing the attachment plane with its planar walls. Furthermore, the wiping system is provided with a fluid line, which is guided along the wiper arm in order to supply a washing nozzle with washing fluid. The fluid line is easily assembled in the wiper arm at the attachment piece through a depression in which the fluid line extends. Beyond the depression in the attachment piece the fluid line extends through the wiper arm by being surrounded by a planar wall of the joint piece or the cover and a pressure spring.

12 Claims, 1 Drawing Sheet

U.S. Patent  Mar. 21, 1995  5,398,370
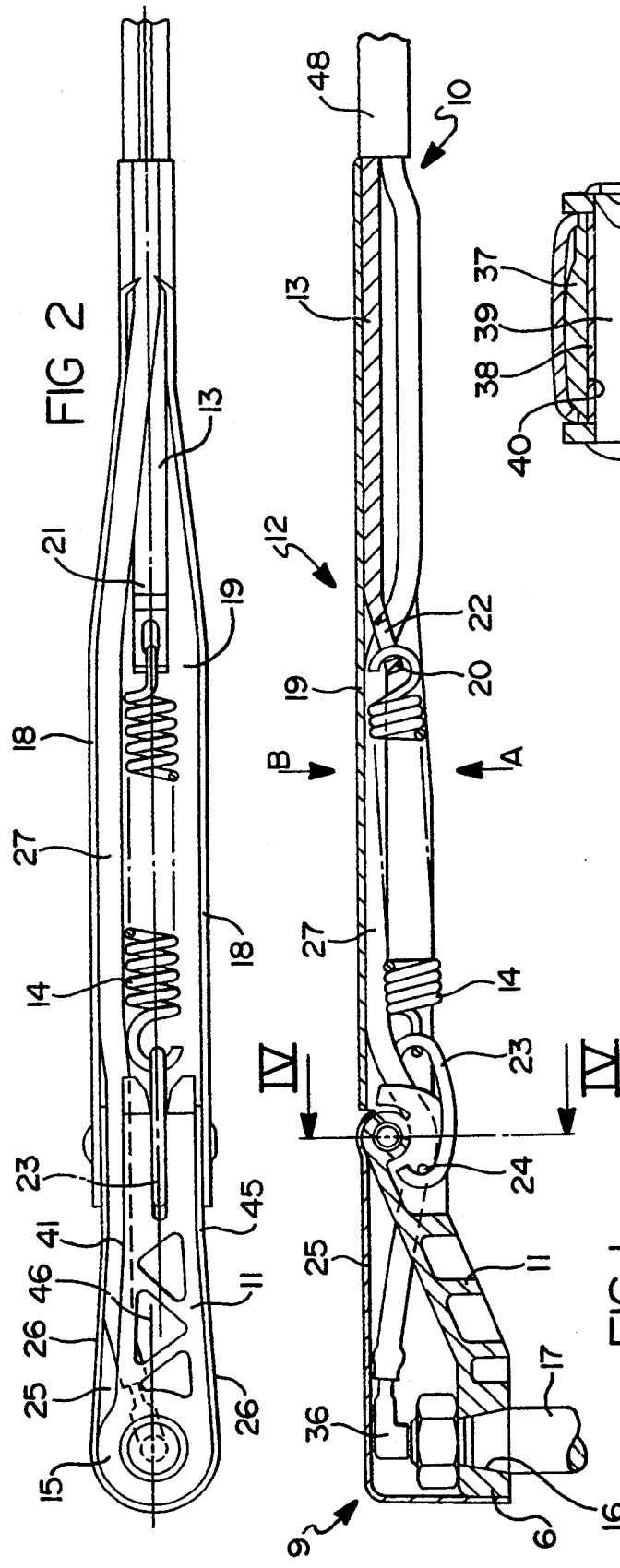
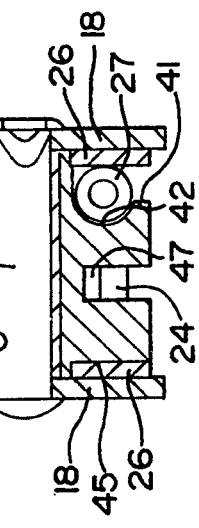
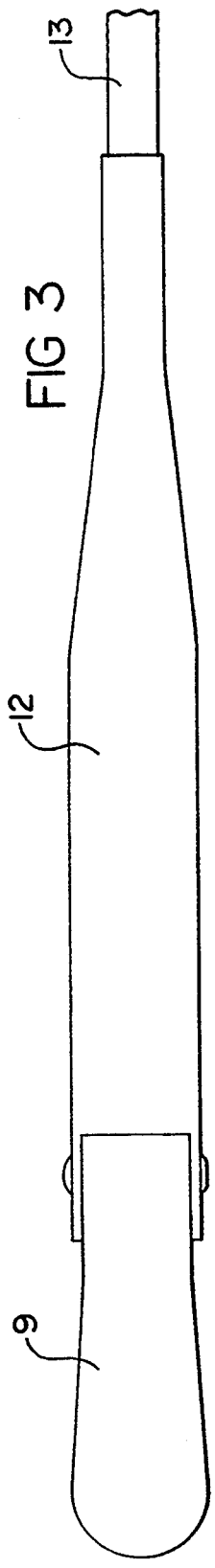
FIG 3
FIG 2
FIG 4
FIG 1

WIPER SYSTEM HAVING A DEPRESSION FOR ACCOMMODATING A FLUID HOSE

BACKGROUND OF THE INVENTION

This invention relates to a wiper system for windshields of motor vehicles, and more particularly to a wiper arm which can be attached to an oscillatorily drivable wiper shaft and have a washing fluid line extend within the wiper arm.

It is common practice today to provide washing nozzles directly at the wiper arm or at the wiper blade in which the washing fluid is supplied through a fluid line extending along the wiper arm. The attachment piece of the wiper arm is known to be covered by a cap made from plastic material. This cap protects the connection between the wiper arm and the wiper shaft. This cap also improves the appearance if the wiper arm is connected to the wiper shaft outside of the vehicle body. On the other hand, many modern motor vehicles are provided with a slot between the windshield and the motor hood, out of which the wiper arms project. The wiper shaft is located below the slot opening so that it is covered by the body sheet. Consequently, a cover is no longer provided. As well as in the case of wiper arms with a cover as in the case of wiper arms without a cover, it may be necessary to safely retain the fluid line in the area of the attachment piece.

A fluid line extending through a sleeve-shaped holding element adjacent a wiper arm comprised of a covered attachment piece is known from German Patent DE-GM 87 06 029.

Also, wiper arms are already known wherein a washing fluid line extends within a U-shaped joint piece. This, for example, is shown in German Patent DE-OS 25 09 876. In particular the fluid line protrudes through the attachment piece and extends throughout the joint piece after passing beneath the hinge of the joint piece. Washing fluid line passages through the wiper shaft are known from U.S. Pat. No. 3,887,956 and from German Patent Nos. DE-OS 39 07 967 and DE-OS 39 07 968. This arrangement also requires the fluid line to extend beneath the hinge of the joint piece.

SUMMARY OF THE INVENTION

The object of the present invention is to design a wiper system for windshields of motor vehicles in which the washing fluid line easily attaches to the wiper arm and is covered either by a cap or by the wiper arm itself.

To achieve this object in accordance with the invention the attachment piece laterally comprises a depression in which the fluid line extends and which is covered by a planar wall of the joint piece or by a cover of the attachment piece. The fluid line can be easily mounted in this depression. The die for forming the attachment piece will not become more complicated as a result of the removal of a recess for a bearing of the joint between the attachment piece and the joint piece in the direction of the axis of the joint since it is the direction that corresponds with the mold removing direction of the depression also.

When the fluid line is in the depression, it should not be pressed together so that its inside cross-section is decreased. Therefore, the distance of the planar wall from the deepest point of the depression should correspond at least approximately to the outside diameter of the fluid line.

For the purpose of assembly of the fluid line it is possible to make the depression accessible vertically to the planar wall or in the direction of the axis of the joint between the attachment piece and the joint piece, respectively, in such a way that the cover is assembled only afterwards or that the cover is in a folded down position during the assembly. However, when the cover or the joint piece are brought into their assembled position it has to be assured that the fluid line remains in the depression. Therefore, it seems more preferable to have the groove accessible in parallel to the planar wall. Then the fluid line can be pressed into the depression through the access, while being deformed in cross-section, yet resuming its original shape as soon as it is in the depression.

Guiding of the fluid line is advantageous, especially in those areas in which the course of the fluid line is bent. Therefore, there is a depression at least in the area of the joint between the attachment piece and the joint piece. As viewed from the side of the back of the joint piece or the cover, the depression is suitably disposed beyond the joint.

In order to limit the width of the wiper arm notwithstanding the lateral course of the fluid line, it is suggested that at the point where a pressure spring is secured to the attachment piece the pressure spring should be positioned closer to the planar wall of the joint piece or the cover opposite the depression.

Due to the lateral course of the fluid line and the eccentric suspension of the pressure spring at the attachment piece with regard to the planar walls, the whole construction of the wiper arm is slightly asymmetrical. When looking onto the windshield of a motor vehicle, however, the wiper arm should look symmetrical. Therefore, the wiper rod extends centrically between the two planar walls of the joint piece, and the point where the pressure spring is secured to the wiper rod is positioned centrically between the two planar walls of the joint piece. The center line of the pressure spring extends slightly diagonal to a longitudinal center plane of the joint piece.

If the longitudinal extending outside planar walls of the attachment piece are symmetrical with regard to a first center plane and, if the joint piece or the cover cap, because of a desired symmetrical appearance of the wiper arm, are formed symmetrically with regard to a second center plane, the first center plane advantageously extends beyond the second center plane at a distance from it as viewed from the outside planar wall of the attachment piece adjacent the depression. Normally the attachment piece of a wiper arm is provided with a hub with a central bore for placing it upon the wiper shaft. Because the hub has to have a certain thickness of material and for reasons of symmetry, the axis of the bore is placed at a distance from the first center plane adjacent the depression. The axis of the bore extends in a second center plane.

BRIEF DESCRIPTION OF THE DRAWINGS

An embodiment of a wiper system according to this invention is shown in the drawings, wherein further advantageous embodiments become obvious, in which:

FIG. 1 is a longitudinal section through a wiper arm with a washing fluid line extending in a depression in the area of the joint between the attachment piece and the joint piece of the wiper arm.

FIG. 2 is a view of the wiper arm of FIG. 1 in the direction of arrow A.

FIG. 3 is a view of the wiper arm of FIG. 1 in the direction of arrow B.

FIG. 4 is a sectional view along line IV—IV of FIG. 1.

DETAILED DESCRIPTION OF THE PREFERRED EMBODIMENT

The wiper arm 10 shown in the figures comprises as essential parts an attachment piece 11, a cover 9 for the attachment piece 11, a joint piece 12, a wiper rod 13 and a pressure spring 14. The attachment piece 11 is manufactured from zinc or aluminum by diecasting and can be non-rotatably fixed onto a wiper shaft 17 by means of a hub 15, provided with a conical opening. The joint piece 12 is made from one metal sheet and is brought to a U-shape with two planar walls 18 extending in a longitudinal direction and one back 19, connecting the two planar walls 18 with each other. The joint piece 12 is rotatably mounted at the attachment piece 11 and is developed symmetrically with regard to a longitudinal center plane 21. The wiper rod 13 extends into the joint piece 12 with one end 20 and is bent to take the shape of a hook at the other end, not shown in detail. Opposite end 20 the wiper rod 13 is embraced by the two planar walls 18 of the joint piece 12 so that it is secured tightly at the joint piece. In this case the wiper rod extends centrically with regard to the longitudinal center plane 21 at least within the joint piece.

The pressure spring is secured in an opening 22 of the wiper rod 13, located in the longitudinal center plane 21 and above a bow 23 at a pin 24 inserted in the attachment piece 11. Consequently the pressure spring 14 biases the joint piece 12 and wiper rod 13 against each other, on the one hand, and the attachment piece 11, on the other hand. This bias creates the pressure which forces the wiper blade, not shown, to lie on a windshield which is to be cleaned.

The cover 9 covers the attachment piece 11 and is pivotally mounted at the attachment piece 11 coaxially with the joint piece 12. The cross-section of the cover is also U-shaped with a back 25 and two planar walls 26, embracing the hub 15 of the attachment piece 11.

A washing nozzle is fixed at the wiper rod 13, not shown in detail, which can be supplied with washing fluid by way of a flexible hose 27. The hose is guided along the wiper arm from the hub 15 of the attachment piece 11, where it is connected at a nipple 36 up to the washing nozzle. The nipple 36 is positioned on a hollow shoulder of the wiper shaft 17, through which the washing fluid flows. As can be seen from FIG. 2 the nipple 36 is not directed into the longitudinal direction of the wiper arm, but is slightly pivoted to the side. The hose 27 is located above the attachment piece 11 and is then led around the recess 37 at the side turned away from the back 25 of the cover cap 9 or the back 19 of the joint piece 12, respectively. The recess 37 takes up a bearing bushing 38 and a joint rivet 39 in a bore 40 in order to form the joint between the attachment piece 11 and the cover 9 as well as the joint piece 12.

In order to support the hose 27, a depression 42 is made in the corresponding outside wall 41 of the attachment piece 11, and it is covered by a planar wall 26 of the cover 9. The distance from the planar wall 26 to the deepest point of the depression 42 corresponds to the outside diameter of the hose 27. On the other hand, the depth of the depression 42 is less than half of the outside diameter of the hose 27. In the preferred embodiment, the depression 42 is accessible in parallel from underneath the attachment piece 11 between the planar wall 26 of the cover 9 and the outside wall 41 of the attachment piece 11. Due to this access the flexible hose 27 can be pressed into the depression 42 from beneath the attachment piece 11 wherein the cover 9 does not have to be pivoted away from the attachment piece 11 during assembly.

While the outside wall 41 has a distance from the corresponding planar wall 26 of the cover 9, the bearing recess 37 projects this outside wall 41 to the corresponding planar wall 18 of the joint piece 12, so that the cover 9 and the joint piece 12 can be perfectly mounted. The cover 9 is also developed symmetrically to the longitudinal center plane 21.

There is no symmetry for the attachment piece 11. The outside wall 41 and the opposite outside wall 45 extend symmetrically to a center plane 46 and parallel to the longitudinal center plane 21. The center plane 46 has a larger distance from the outside wall 41 than the longitudinal center plane 21. Aside from the part of the bearing recess 37 projecting from the outside wall 41 and the depression 42, the attachment piece 11 is developed symmetrically to the center plane 46 in the area of the joint between the attachment piece 11 and the joint piece 12 as well as in the area of the pin 24. In this plane the attachment piece 11 is provided with a slot 47, in which the bow 23 is secured to the pin 24. The point where the pressure spring 14 is secured to the attachment piece 11 is in the center plane 46, and the point where the pressure spring 14 is secured to the wiper rod 13 is in the center plane 21. The axis of the pressure spring 14 runs slightly diagonally to the longitudinal direction of the wiper arm 10.

The hub 15 of the attachment piece 11 has approximately an equal thickness of material all around. The axis of the opening 16 of the hub 15 extends in the longitudinal center plane 21. The hub 15 is displaced from the center plane 46 towards the planar wall 26 of the cover 9, which lies opposite of the depression 42.

Within the joint piece 12 the hose 27 is guided along in one corner formed by the back 19 and a planar wall 18, wherein the hose 27 cannot fall out due to the pressure exerted against the hose 27 by the pressure spring 14. This requires the distance between the pressure spring 14 and the planar wall 18 to be slightly smaller than the outside diameter of the hose 27. In the area of the wiper rod 13 the hose 27 extends along the bottom side of the back 19 of the joint piece 12 and is kept at the bottom side outside of the joint piece 12 by a plastic clamp 48 which is fastened onto the wiper rod 13.

In case of a wiper arm 10 without cover 9 a depression 42 can be covered by a planar wall 18 of the joint piece 12 in the area of the joint between the attachment piece 11 and the joint piece 12.

It will be apparent to those skilled in the art that the foregoing disclosure is exemplary in nature rather than limiting, the invention being limited only by the appended claims.

What is claimed is:

1. A wiper system for windshields of motor vehicles having a wiper arm adapted to carry a wiper blade and which can be attached to an oscillatorily drivable wiper shaft, said wiper system comprising:

an attachment piece having two outside planar walls running in a longitudinal direction, said attachment piece having a depression extending along a longitudinal axis in one of said planar walls;

an elongated Joint piece pivotally coupled to said attachment piece, said elongated joint piece generally having a U-shaped, transverse cross-section, including two planar walls, said planar walls embracing said attachment piece;

a cover, said cover generally having a U-shaped cross-section including two planar walls, said planar walls of said cover connected to said attachment piece; and a fluid line positioned in said depression of said attachment piece and extending along a longitudinal axis, said fluid line partially enclosed by at least one of said planar walls of said elongated joint piece and by said planar walls of said cover, wherein said attachment piece planar walls are essentially symmetrically formed with regard to a first center plane, and said joint piece and said cover are formed symmetrically with regard to a second center plane, and said first center plane extends parallel to said second center plane.

2. A wiper system according to claim 1, wherein said planar walls of said cover are spaced and wherein the distance from said planar walls of said cover to a deepest point of said depression of said attachment piece corresponds at least approximately to an outside diameter of the fluid line.

3. A wiper system according to claim 2, wherein said depression of said attachment piece extends generally parallel to said planar walls of said cover.

4. A wiper system according to claim 2, wherein said depression of said attachment piece opens generally facing towards one of said planar walls of said cover.

5. A wiper system according to claim 1, wherein said depression of said attachment piece extends within said elongated joint piece.

6. A wiper system according to claim 1, further comprising a wiper rod having a first and second end, said wiper rod fastened to said elongated joint piece and said first end of said wiper rod extending into said elongated joint piece, and wherein a pressure spring having a first and second end has its first end secured to said first end of said wiper rod, and said second end of said pressure spring is secured to said attachment piece, and said second end of said pressure spring is positioned more closely to said planar walls of said elongated joint piece and said cover on a side of said second center plane opposite said depression of said attachment piece than said planar walls of said elongated joint piece and said cover on the same side of said second center plane as said depression.

7. A wiper system according to claim 6, wherein said wiper rod runs centrically between both said planar walls of said elongated Joint piece and wherein said first end of said pressure spring is preferably positioned centrically between both said planar walls of said elongated joint piece.

8. A wiper system according to claim 6, wherein said fluid line extends between one of said planar walls of said elongated joint piece and said pressure spring.

9. A wiper system according to claim 6, wherein said fluid line is secured by a clamp to said wiper rod.

10. A wiper system according to claim 1, wherein said attachment piece has a hub with a central bore for placing it upon said wiper shaft, and the axis of said central bore is arranged at a distance from said first center plane adjacent said depression of said attachment piece.

11. A wiper system according to claim 1, wherein said attachment piece has a hub with a central bore for placing it upon said wiper shaft, and the axis of said central bore lies within said second center plane of said elongated joint piece and of said cover.

12. A wiper system according to claim 1, wherein said outside planar wall of said attachment piece adjacent said depression extends essentially parallel to and adjacent said planar wall of said elongated joint piece and of said cover and a bearing recess of said attachment piece protrudes laterally from said outside wall adjacent said joint piece.

* * * * *